March 1, 1960    JEAN-FÉLIX PAULSEN    2,926,546
DYNAMIC DAMPERS
Filed July 18, 1958

INVENTOR
JEAN FELIX PAULSEN
BY
ATTORNEY

United States Patent Office 2,926,546
Patented Mar. 1, 1960

2,926,546

DYNAMIC DAMPERS

Jean-Félix Paulsen, Paris, France, assignor to Society: Luxembourgeoise de Brevets et de Participations, Luxemburg, a society of France Application July 18, 1958, Serial No. 749,358

Claims priority, application France July 22, 1957

3 Claims. (Cl. 74—574)

The present invention relates to dynamic dampers for use on rotating shafts, in particular to suppress or minimise stresses resulting from torsional vibrations at critical speeds.

The object of this invention is to provide a damper of this kind which is better adapted to meet the requirements of practice than those used up to this time.

For this purpose, according to the present invention, the damper comprises, in combination, a body secured rigidly to said shaft, said body including an annular disc coaxially fixed to said shaft and extending transversely to the axis thereof and an annular part rigid with said disc at the outer periphery thereof, said annular part projecting on both sides of said disc transversely thereto and being coaxial therewith, an annular casing coaxially surrounding a portion of said body, said portion including at least said annular part, with a slight clearance space left between the inner wall of said casing and the outer wall of said body portion, a fluid viscous material filling said clearance space so that said material tends to stick to the inner wall of said casing and to the outer wall of said body portion and damps the movements of said casing with respect to said annular part, an annular fly-wheel fixed to said casing and surrounding it coaxially, two annular flanges rigid with said disc extending transversely thereto on opposite sides thereof respectively, the radius of said flanges being smaller than that of said annular part, and two annular blocks of an elastomeric material each interposed between one of said flanges and the portion of said casing that is facing said flange, said blocks of elastomeric material adhering strongly both to said casing and to said flanges.

Preferred embodiments of the present invention will be hereinafter described with reference to the accompanying drawings given merely by way of example and in which.

Figure 1:
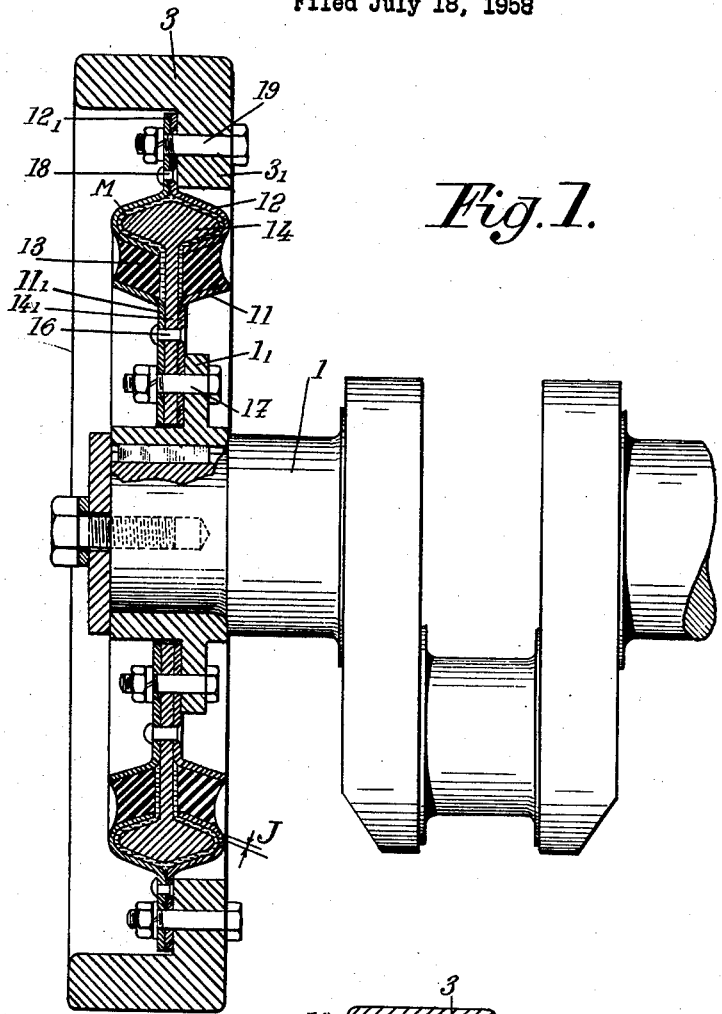
Fig. 1 is an axial sectional view of a dynamic damper made according to an embodiment of the invention.

The dynamic damper shown by Fig. 1 is mounted on a crankshaft 1.

It includes a body 11—$11_1$—14—$14_1$ secured rigidly to said shaft 1 through a sleeve keyed on said shaft and provided with an annular projection $1_1$ on which annular discs $14_1$—$11_1$ are fixed by means of bolts 17.

The annular disc shaped element $14_1$ of the above mentioned body carries at its periphery, integral therewith, an annular part 14 projecting on both sides of said disc shaped element transversely thereto, said part 14 being coaxial with shaft 1.

Two plates $11_1$ rigidly assembled with said element $14_1$ by rivets 16 are bent outwardly to form annular flanges 11 extending transversely to said element $14_1$ on opposite sides thereof respectively, said flanges 11 being located between shaft 1 and annular part 14.

An annular casing 12 is mounted coaxially to shaft 1 so as to surround annular part 14. Said casing 12 is made of two portions assembled together by rivets 18 and forming an outward annular rim $12_1$ to which a fly-wheel 3 is secured by means of bolts 19.

Casing 12 surrounds annular part 14 with a slight clearance space left between the inner wall of said casing 12 and the outer wall of said annular part 14. The thickness J of said clearance space is of some tenths of a millimeter.

This clearance space is filled with a fluid viscous material M which tends to stick to the inner wall of casing 12 and to the outer wall of annular part 14.

Such a material is advantageously constituted by a polymer obtained from a monomer having only one double bond, such as an ethylene hydrocarbon $C_nH_{2n}$, or by a mixture of such polymers. Among these polymers, it is found that poly-isobutylenes having a molecular weight ranging from 5,000 to 25,000 or mixtures of these bodies in varying proportions with poly-isobutylenes of an even higher molecular weight of the order of 80,000 are particularly suitable for the purpose in view.

Some silicone elastomers are also suitable for this purpose.

Blocks 13 of rubber or another elastomer are adhered to flanges 11 and to the portions of the outer wall of casing 12 which are facing said flanges.

Such a damper works as follows:

Any torsional oscillation of the free end of crankshaft 1 about its axis imparts a corresponding angular oscillation to body 11—$11_1$—14—$14_1$ and therefore acts through the effect of the torsional rigidity of resilient blocks 13 upon casing 12 and fly-wheel 3 fixed thereon. Due to the inertia of these last mentioned elements, relative angular displacements take place between annular part 14 and casing 12, subjecting the viscous material M to shearing stresses which supply an additional damping added to that of resilient blocks 13, which permits of damping in the best possible conditions the torsional vibrations of crankshaft 1.

Figure 2:
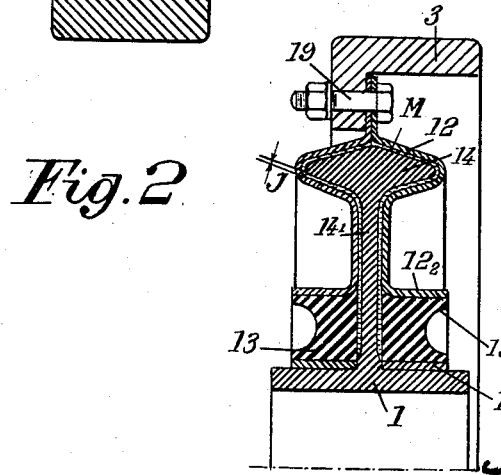
Fig. 2 is a similar view showing a modification.

In the modification of Fig. 2, casing 12 extends inwardly along disc $14_1$ and its inner edges are bent to form flanges $12_2$. Flanges 11 are applied directly against shaft 1 and the rubber blocks 13 are inserted between flanges 11 and flanges $12_2$.

With such an arrangement, the torsional rigidity of said rubber blocks 13 is reduced to a minimum value due to the fact that their mean radius is small, their radial thickness relatively small and they are provided with annular grooves such as $13_1$.

The operation of such a damper, in which the damping action of viscous material M has a preponderating action whereas the resilient return effect of blocks 13 is greatly reduced, tends to be similar to that of Lanchester's dampers.

In a general manner, while I have, in the above description, disclosed what I deem to be practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claims is:

1. A dynamic damper for use on a rotating shaft which comprises, in combination, A body secured rigidly to said shaft, said body including an annular disc coaxially fixed to said shaft and extending transversely to the axis thereof and an annular part rigid with said disc at the outer periphery thereof, said annular part projecting on both sides of said disc transversely thereto and being coaxial therewith, an annular casing coaxially surrounding a portion of said body, said portion including at least said annular part, with a slight clearance space left between the inner wall of said casing and the outer wall of said body portion, An annular fly-wheel fixed to said casing and surrounding it coaxially, two annular flanges rigid with said disc extending transversely thereto on opposite sides thereof respectively, the radius of said flanges being smaller than that of said annular part, Two annular blocks of an elastomeric material extending on either sides, respectively, of a portion of said annular disc, at a small distance therefrom, said blocks being each interposed between one of said flanges and the portion of said casing that is facing said flange, said blocks of elastomeric material adhering strongly both to said casing and to said flanges and a fluid viscous material filling said clearance space and the spaces between said blocks and said disc portion so that said material tends to stick to the inner wall of said casing and to the outer wall of said body portion and damps the movements of said casing with respect to said annular part.

2. A dynamic damper according to claim 1 in which the radius of said flanges is greater than that of said shaft and said blocks are interposed between said flanges and a portion of said casing that surrounds said annular part.

3. A dynamic damper according to claim 1 in which the radius of said flanges is substantially equal to that of said shaft, said casing extending toward said shaft beyond said annular part so as to surround a portion of said disc, and flanges rigid with the inner edges of said casing and extending transversely thereto on opposite sides thereof respectively, said blocks of elastomeric material extending between the first mentioned flanges and the second mentioned flanges respectively.

References Cited in the file of this patent

UNITED STATES PATENTS

| | | |
|---|---|---|
| 2,477,081 | Peirce | July 26, 1949 |
| 2,585,382 | Guernsey | Feb. 12, 1952 |
| 2,636,399 | O'Connor | Apr. 28, 1953 |